(12) United States Patent
Lee et al.

(10) Patent No.: US 8,155,833 B2
(45) Date of Patent: Apr. 10, 2012

(54) METHOD FOR CONTROLLING COMPRESSOR OF AIR CONDITIONER FOR VEHICLE

(75) Inventors: Jeong-Hoon Lee, Daejeon (KR); Sae-Won Oh, Daejeon (KR); Tae-Eun Kim, Daejeon (KR); Young-Min Kim, Daejeon (KR); Jae-Yup Kim, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 396 days.

(21) Appl. No.: 12/470,513

(22) Filed: May 22, 2009

(65) Prior Publication Data

US 2010/0076602 A1 Mar. 25, 2010

(30) Foreign Application Priority Data

Sep. 25, 2008 (KR) .................. 10-2008-0094351

(51) Int. Cl.
*G06F 7/00* (2006.01)
(52) U.S. Cl. ............................... 701/36; 700/275
(58) Field of Classification Search .............. 701/275, 701/726, 281, 36
See application file for complete search history.

(56) References Cited

U.S. PATENT DOCUMENTS

| | | | | | |
|---|---|---|---|---|---|
| 4,375,228 A | * | 3/1983 | Widdowson | ............... | 138/46 |
| 5,056,990 A | * | 10/1991 | Nakajima | ............... | 417/295 |
| 5,199,272 A | * | 4/1993 | Yamanaka et al. | .............. | 62/133 |
| 6,209,333 B1 | * | 4/2001 | Bascobert | .............. | 62/217 |
| 6,356,825 B1 | | 3/2002 | Takenaka et al. | | |
| 6,453,685 B2 | * | 9/2002 | Ota et al. | .............. | 62/115 |

FOREIGN PATENT DOCUMENTS

| | | |
|---|---|---|
| JP | 5-50844 A | 3/1993 |
| JP | 11-123930 A | 5/1999 |
| JP | 2000-158939 A | 6/2000 |
| JP | 2005-90312 A | 4/2005 |
| JP | 2005-104305 A | 4/2005 |

OTHER PUBLICATIONS

Office Action in Japanese Application No. 2009-126495 mailed Jul. 26, 2011.

* cited by examiner

*Primary Examiner* — Faye M. Fleming
(74) *Attorney, Agent, or Firm* — Birch, Stewart, Kolasch & Birch, LLP

(57) ABSTRACT

The present invention relates to a method for controlling the operation of a compressor for preventing noise that occurs in case of the shortage of refrigerant flow caused by less discharge capacity of the compressor of an air conditioner for a vehicle. The compressor includes a cylinder bore for compressing a refrigerant, a piston inserted into the cylinder bore, a swash plate having a controllable slope with respect to a drive shaft, and a control valve for controlling the slope of the swash plate. The discharge capacity of the compressor is increased if it is determined that vehicle speed and accelerating rate satisfy predetermined conditions. If a low flow rate state of refrigerant of the compressor is predicted, the ECV duty is increased to prevent the compressor from entering the low flow rate state, thereby improving the workability of the compressor and solving the noise problem.

7 Claims, 6 Drawing Sheets

METHOD FOR CONTROLLING COMPRESSOR OF AIR CONDITIONER FOR VEHICLE

CROSS REFERENCE TO RELATED APPLICATIONS

The present application is related to, and claims priority to Korean patent application No. 10-2008-0094351 filed on Sep. 25, 2008, the entire contents of which are hereby incorporated by reference.

BACKGROUND OF THE INVENTION

1. Field of the Invention

The present invention relates to an air conditioner for a vehicle, and more particularly, to a method for controlling the operation of a compressor for preventing noise that occurs in case of the shortage of refrigerant flow caused by less discharge capacity of the compressor of an air conditioner for a vehicle.

2. Description of the Related Art

An air conditioner is installed to heat or cool an interior of a vehicle. In a cooling system of such an air conditioner, a swash plate type compressor is generally employed as a compressor for compressing a vapor refrigerant of low temperature and low pressure, which is introduced from an evaporator, into a high temperature and high pressure refrigerant and then transferring it to a condenser.

The swash plate type compressor is operated according to on/off of an air conditioner switch. If the compressor is operated, temperature of the evaporator is lowered, and if the compressor is stopped, the temperature of the evaporator is raised.

Meanwhile, swash plate type compressors are classified into a fixed capacity compressor and a variable capacity compressor. These compressors are operated by power transmitted from rotating force of a vehicle engine. Here, the fixed capacity compressor is provided with an electronic clutch to control the operation of the compressor.

However, in a case where the electronic clutch is provided, engine RPM may be varied when the compressor is operated or stopped, which may disturb stable running of the vehicle.

Thus, recently, a clutch is not provided, but the variable capacity compressor that is always operated while the engine is driven and capable of varying the refrigerant discharge capacity of by changing a slope of a swash plate of the compressor is used.

In such a variable capacity swash plate type compressor, a pressure control valve is generally used to control a slope of the swash plate to regulate the refrigerant discharge amount. In recent, a swash plate slope control valve (hereinafter, referred to as "ECV"), of which the operation is controlled in an electric manner, is used.

Thus, in a case where a variable capacity swash plate type compressor employing an ECV, the slope of the swash plate is changed by the duty of the ECV or an applied current value, and the refrigerant discharge amount of the compressor is determined depending on the slope of the swash.

As a result, it means that the duty of ECV or the applied current value is an important factor to determine the evaporator temperature (hereinafter, the case where the compressor operates means that the ECV duty is more than zero (0) and a refrigerant is discharged).

The aforementioned ECV duty is a percentage value exhibiting a time period, during which the ECV is on, per the entire time. Thus, in a case where the duty is high, the refrigerant discharge of the compressor increases, while in a case where the duty is low, the refrigerant discharge decreases.

FIG. 1 is a sectional view showing an inside configuration of a conventional variable capacity swash plate type compressor.

As shown in the figure, in a conventional variable capacity swash plate type compressor, a center bore 11 is formed through a center of a cylinder block 10, and a plurality of cylinder bores 13 are formed through the cylinder block 10 to radially surround the center bore 11. Also, a piston 15 is movably installed in each cylinder bore 13, thereby compressing a refrigerant in the cylinder bore 13.

Meanwhile, a front housing 20 is installed at one end of the cylinder block 10. The front housing 20 and the cylinder block 10 define a crank chamber 21 therein.

In addition, a rear housing 30 is installed at the other end of the cylinder block 10, i.e., at a side opposite to the front housing 20. A suction chamber 31 is formed in the rear housing to selectively communicate with the cylinder bore 13. At this time, the suction chamber 31 serves to transfer a refrigerant to be compressed into the cylinder bore 13.

Also, a discharge chamber 33 is formed in the rear housing 30. The discharge chamber 33 is formed in a region corresponding to a center of a side of the rear housing 30 that faces the cylinder block 10. The discharge chamber 33 gives a place where the refrigerant compressed in the cylinder bore 13 stays temporarily. A control valve 35 is provided at one side of the rear housing 30, wherein the control valve 35 controls an angle of a swash plate 48 which will be described later, by adjusting a degree of opening of a channel between the discharge chamber 33 and the crank chamber 21.

Meanwhile, a drive shaft 40 is rotatably installed through the center bore 11 of the cylinder block 10 and a shaft hole 23 of the front housing 20. The drive shaft 40 is rotated by driving force transferred from an engine. The drive shaft 40 is rotatably installed to the cylinder block 10 and the front housing 20 by a bearing 42.

Also, a rotor 44 is installed to the crank chamber 21 such that the drive shaft 40 passes through a center of the rotor and the rotor rotates together with the drive shaft 40. At this time, the rotor 44 is substantially disk-shaped and is fixed to the drive shaft 40. Also, a hinge arm 46 is formed to protrude on one side of the rotor 44.

A swash plate 48 is hinged to the rotor 44 and installed to the drive shaft 40 to rotate together with the drive shaft 40. The swash plate 48 is installed to the drive shaft 40 to have an angle changed according to discharge capacity of the compressor. In other words, the swash plate 40 is positioned between a state that it is perpendicular to a lengthwise direction of the drive shaft 40 and a state that it is inclined at a predetermined angle with respect to the drive shaft 40. The swash plate 48 has an edge connected to the pistons 15 through shoes 50. In other words, the edge of the swash plate 48 is connected to a connector 17 of the piston 15 through the shoe 50 such that the piston 15 is linearly reciprocated in the cylinder bore 13 by the rotation of the swash plate 48.

A connection arm 52 connected to the hinge arm 46 of the rotor 44 is formed to protrude on the swash plate 48. A hinge pin 54 is installed at a front end of the connection arm 52 in a direction perpendicular to the lengthwise direction of the connection arm 52, and the hinge pin 54 is movably hooked to a support 47 formed at a front end of the hinge arm 46 of the rotor 44.

A back spring 56 is installed to give elastic force between the rotor 44 and the swash plate 48. The back spring 56 is installed around an outer surface of the drive shaft 40 and gives elastic force in a direction in which a slope of the swash plate 48 decreases.

A swash plate stopper 58 is formed to protrude on one surface of the swash plate 48. The swash plate stopper 58 serves to regulate a degree of inclination of the swash plate 48 with respect to the drive shaft 40.

A shaft stopper 60 is provided at one end of the drive shaft 40. The shaft stopper 60 is installed around the outer surface of the drive shaft 40, and the shaft stopper 60 serves to regulate an installation location of the swash plate 48 when it erected in a direction perpendicular to the lengthwise direction of the drive shaft 40.

Meanwhile, Japanese Laid-open Patent Publication No. 2005-104305 discloses a technique of maximizing the discharge capacity of a compressor regardless of a target cooling temperature when a vehicle is decelerated such that deceleration energy may be maximally used as compressor driving energy when a vehicle is decelerated. However, in this technique, there is a problem in that the compressor discharge capacity is unnecessarily increased to the maximum to thereby hinder refrigerant from flowing smoothly.

In addition, when the refrigerant discharge amount of the compressor is small, the refrigerant may not circulate smoothly in the compressor if the above state is continued, which may cause noise.

Thus, the ECV duty is kept in a low state, so that noise is generated when flow rate of refrigerant of the compressor is small and the workability of the compressor is deteriorated, thereby causing a problem in use.

SUMMARY OF THE INVENTION

The present invention is conceived to solve the aforementioned problems in the prior art. An object of the present invention is to provide a method for controlling a compressor of an air conditioner for a vehicle, wherein the workability of a compressor is improved by predicting a low flow rate state of refrigerant of the compressor and then increasing ECV duty.

According to an aspect of the present invention for achieving the objects, there is provided a method for controlling a compressor of an air conditioner for a vehicle, comprising the steps of: monitoring whether vehicle speed and accelerating rate satisfy predetermined conditions and determining whether a variable capacity swash plate type compressor enters a low flow rate state of refrigerant; and controlling discharge capacity of the compressor to a predetermined value if it is determined that the compressor enters the low flow rate state of refrigerant. (In a method for controlling a compressor of an air conditioner for a vehicle according to the present invention, wherein the compressor includes a cylinder bore for compressing a refrigerant, a piston inserted into the cylinder bore, a swash plate having a controllable slope with respect to a drive shaft, and a control valve for controlling the slope of the swash plate, the method comprises the step of controlling discharge capacity of the compressor to a predetermined value if it is determined that vehicle speed and accelerating rate satisfy predetermined conditions and thus the compressor enters a low flow rate state of refrigerant.

At this time, in the step of controlling discharge capacity of the compressor to a predetermined value, the discharge capacity of the compressor may be controlled to the predetermined value if the vehicle speed, the accelerating rate and the discharge capacity of the compressor satisfy predetermined conditions, and the predetermined value may be an approximately middle value in a discharge capacity range of the compressor.

In addition, after the step of controlling discharge capacity of the compressor to a predetermined value, the method may further comprise the steps of determining whether a time of maintenance during which the discharge capacity is maintained to the predetermined value elapses; controlling the discharge capacity in a common manner if the time of maintenance elapses; and determining whether a preset time of cycle elapses, wherein after the time of cycle elapses, the above steps are repeated from the step of determining whether a compressor enters a low flow rate state of refrigerant.

Here, the approximately middle value in the discharge capacity range may be a predetermined value between 45% and 65% in the discharge capacity range.

Further, in the step of controlling discharge capacity of the compressor to a predetermined value, the discharge capacity of the variable capacity swash plate type compressor may be increased by a predetermined value.

In the meantime, after the discharge capacity of the compressor is increased, the discharge capacity of the compressor may be linearly reduced according to a predetermined reduction rate.

Here, the discharge capacity of the compressor may be increased by increasing ECV duty by about 10% thereof.

In addition, the reduction rate of the discharge capacity of the compressor may be about 20% of ECV duty per minute.

In the meantime, when it is determined whether the compressor enters a low flow rate state of refrigerant, it may be considered whether refrigerant pressure of the compressor satisfies a predetermined condition.

Preferred embodiment according to the present invention will be described in more detail with reference to the accompanying drawings. Accordingly, the features and advantages of the present invention will become apparent.

DESCRIPTION OF THE PREFERRED EMBODIMENT

Hereinafter, preferred embodiments of a method for controlling a compressor of an air conditioner for a vehicle according to the present invention will be described in detail with reference to the accompanying drawings.

First, an air conditioner control unit for controlling operation of the air conditioner and an engine control system according to embodiments of the present invention will be described in detail with reference to FIG. 2.

Figure 1:
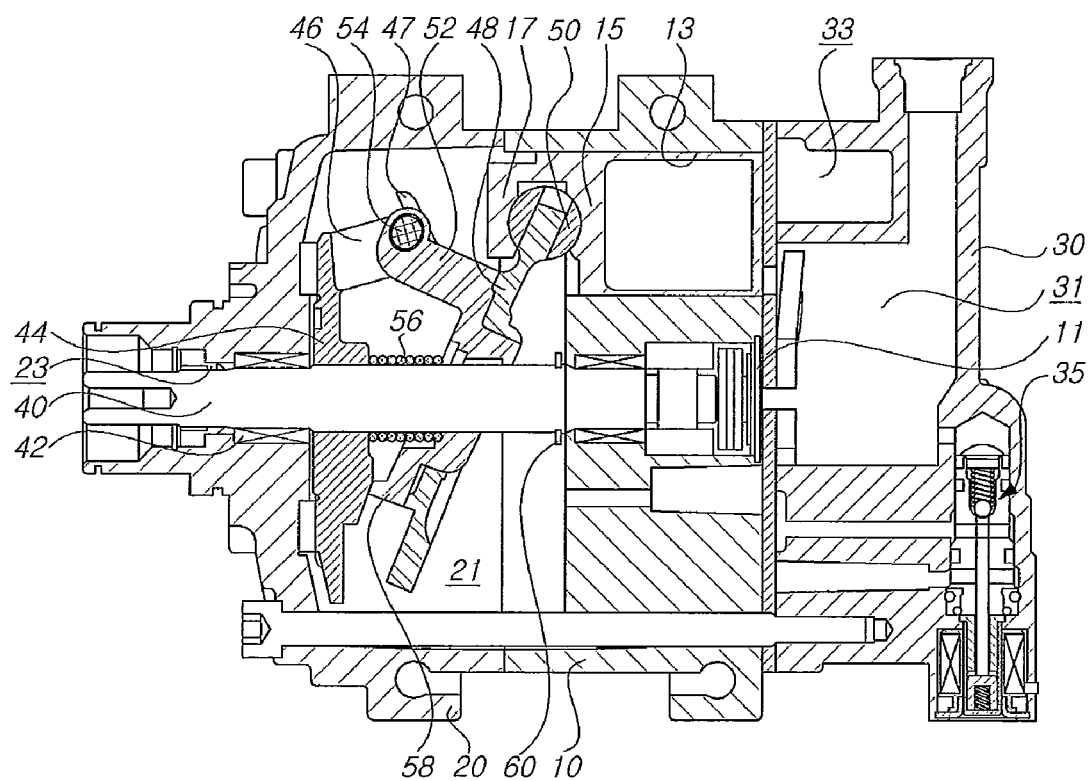
FIG. 1 is a sectional view showing an inside configuration of a conventional variable capacity swash plate type compressor.
Figure 2:
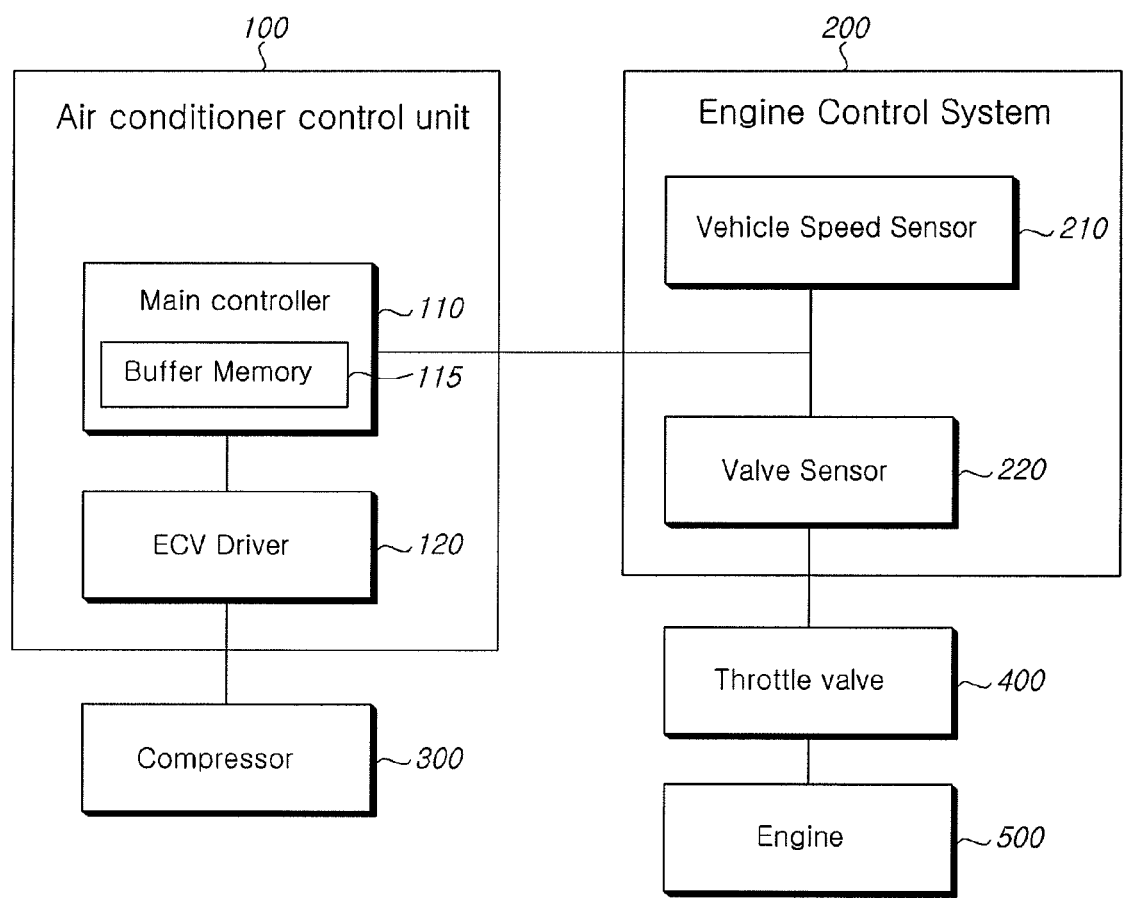
FIG. 2 is a block diagram showing an air conditioner control unit and an engine control system provided in the present invention.

FIG. 2 is a block diagram showing an air conditioner control unit and an engine control system provided in the present invention.

As shown in the figure, the air conditioner for a vehicle according to the present invention includes an air conditioner control unit 100 for controlling operation of a compressor 300. The air conditioner control unit 100 detects the state information on a vehicle and controls the discharge capacity of the compressor 300 such that the temperature inside the vehicle is adjusted as desired by a user.

To this end, the air conditioner control unit 100 includes a main controller 110. The main controller 110 calculates the discharge capacity of the compressor 300 according to the state information including vehicle interior temperature, outside temperature, evaporator temperature, solar flux, engine RPM, vehicle speed, refrigerant pressure (hereinafter, referred to as "APT") and refrigerant temperature, and controls the operation of the compressor 300 using an ECV driver 120, which will be described later.

In addition, the main controller 110 increases the discharge capacity of the compressor 300 when it is determined that the compressor 300 is in a low flow rate state using low flow rate determination factors (vehicle speed, accelerating rate, APT, compressor operating rate, and so on) in order to prevent the compressor 300 from entering the low flow rate state of refrigerant.

To this end, the main controller 110 includes therein a buffer memory 115 for storing the low flow rate determination factors. In other words, the buffer memory 115 stores the vehicle speed, the accelerating rate and the APT, which are transmitted from an engine control system 200, which will be described later, and the ECV duty (corresponding to the compressor operating rate) collected from the ECV driver 120 in time sequence.

Hereinafter, the term "low flow rate state of refrigerant" used herein means a state that the workability of the compressor is deteriorated due to a shortage of lubrication caused by less refrigerant flow and noise is accordingly generated.

Meanwhile, the air conditioner control unit 100 controls the discharge capacity of the compressor by adjusting the ECV duty such that the slope of the aforementioned swash plate 48 is controlled. To this end, the air conditioner control unit 100 is provided with the ECV driver 120.

The ECV driver 120 is to control the discharge capacity of the compressor 300 and adjusts a degree of opening of a channel between the discharge chamber 33 and the crank chamber 21 through the control valve 35 to control the angle of the swash plate 48, which will be described later, and thus to control the discharge capacity of the compressor 300.

Also, the embodiment of the present invention includes an engine control system 200 for controlling output of an engine 500 to adjust an engine rotation rate (hereinafter, referred to as "RPM")) of a vehicle.

The engine control system 200 is to adjust output of the engine 500 according to a driving state of the vehicle, and adjusts the amount of fuel and air input into the engine 500 through a throttle valve 400 by the manipulation of a driver to control output of the engine 500.

In addition, the engine control system 200 provides the main controller 110 of the air conditioner control unit 100 with the vehicle speed and accelerating rate among the low flow rate determination factors. To this end, the engine control system 200 comprise a vehicle speed sensor 210 for measuring vehicle speed and transmitting the measured value to the main controller 110, and a valve sensor 220 for measuring a degree of opening of the throttle valve 400 to calculate accelerating rate and then providing the measured accelerating rate to the main controller 110.

As mentioned above, the values measured by the vehicle speed sensor 210 and the valve sensor 220 are stored in the buffer memory 115 in time sequence.

Hereinafter, it will be explained in detail with reference to FIGS. 3 to 6 how air conditioner control units according to embodiments of the present invention detect a refrigerant shortage state of a compressor and increase the discharge capacity of the compressor.

First, a first embodiment of the present invention will be described with reference to FIGS. 3 and 4.

Figure 3:
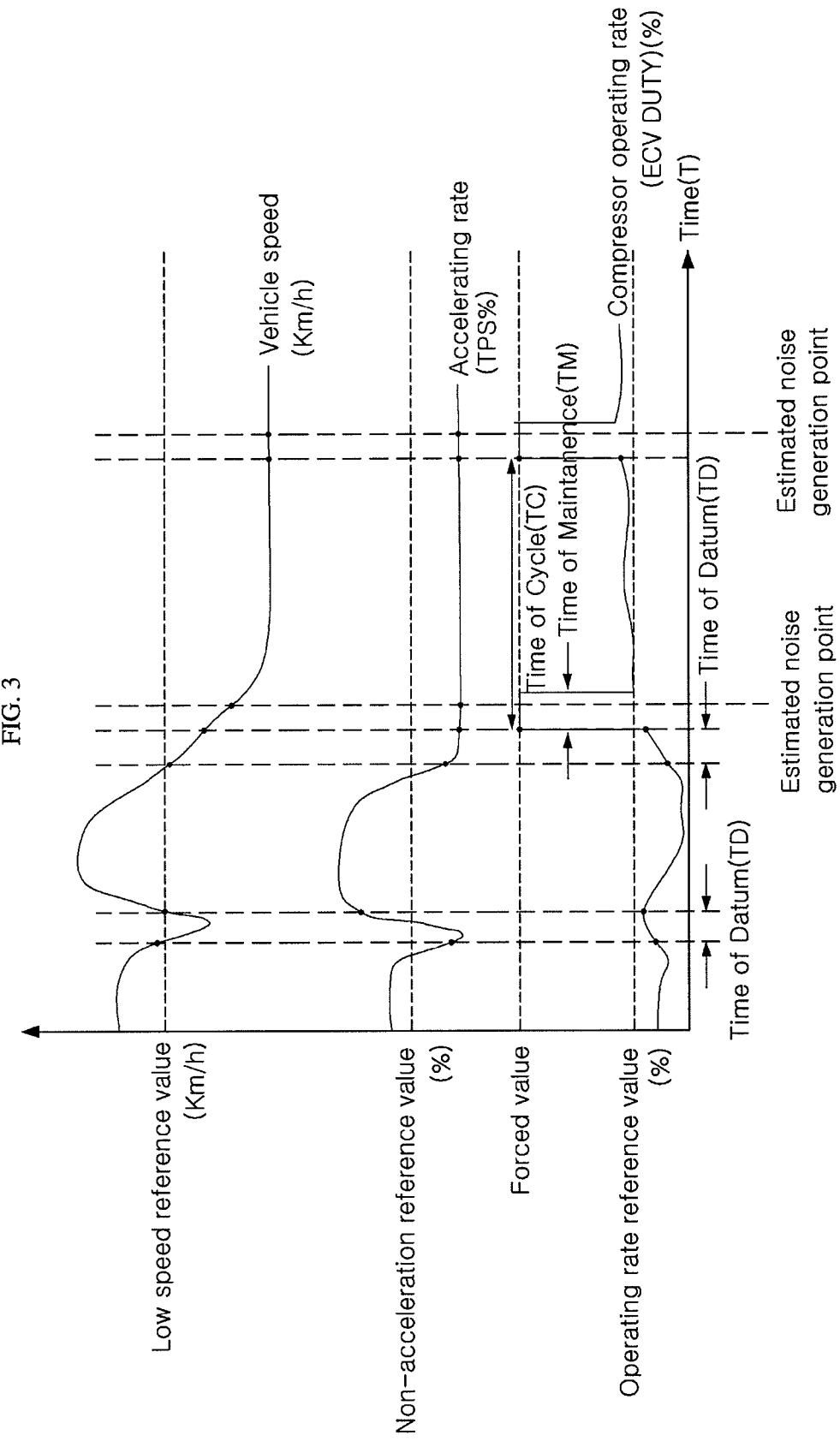
FIG. 3 is a graph showing a change in ECV duty according to the operation in accordance to a first embodiment of the present invention.
Figure 4:
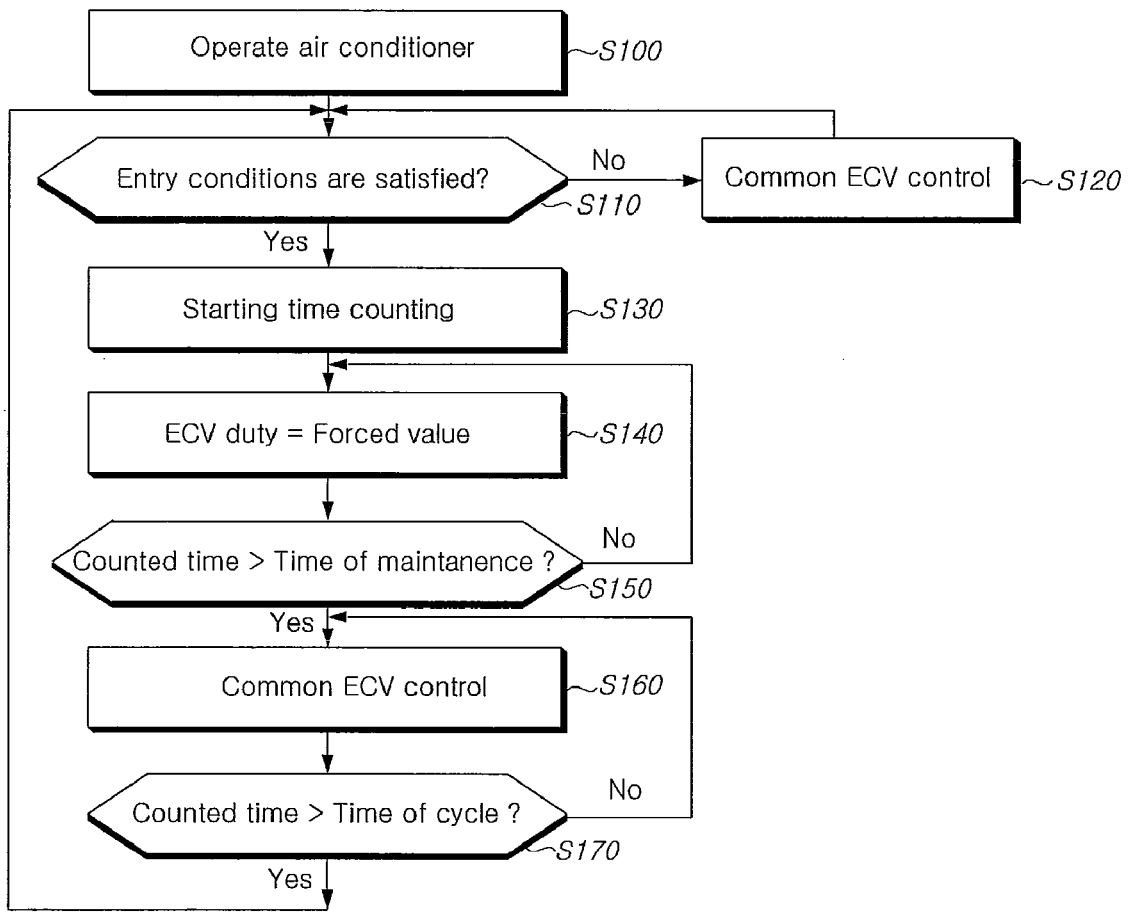
FIG. 4 is a flowchart illustrating a method for controlling a compressor of an air conditioner for a vehicle according to the first embodiment of the present invention.

FIG. 3 is a graph showing a change in ECV duty according to the operation in accordance to a first embodiment of the present invention, and FIG. 4 is a flowchart illustrating a method for controlling a compressor of an air conditioner for a vehicle according to the first embodiment of the present invention.

In FIG. 3, the uppermost graph represents vehicle speed, the graph thereunder represents vehicle accelerating rate that is measured by the valve sensor 220, and the lowermost graph represents ECV duty of the compressor. An x axis represents time.

At this time, the vehicle speed is expressed in the unit of km/h, the accelerating rate is expressed as a percentage of opening of the throttle valve 400 (TPS %), and the ECV duty of a compressor is expressed in the unit of %.

Here, when continued over a predetermined time (hereinafter, referred to as "time of datum") are conditions that the vehicle speed is not more than a predetermined speed (hereinafter, referred to as "low speed reference value"), the accelerating rate is not more than a predetermined value (hereinafter, referred to as "non-acceleration reference value") and the ECV duty is not more than a predetermined value (hereinafter, referred to as "operating rate reference value"), the compressor enters a low flow rate state of refrigerant to generate noise, and the main controller 110 determines that the workability is deteriorated. Accordingly, if the low flow rate state of refrigerant is detected, the main controller 110 increases the ECV duty to a predetermined value.

At this time, the low speed reference value is expressed in the unit of Km/h, the non-acceleration reference value is a reference value, which defines a state where a vehicle is not accelerated or the accelerating rate is very low, and which is expressed as the percentage of opening of the throttle valve 400 (TPS %), and the operating rate reference value is an arbitrary value pertaining to a middle section in a compressor operable range and expressed as ECV duty in the unit of %. For example, assuming that the ECV duty of a vehicle compressor is varied between 35% and 85%, the operating rate reference value is an arbitrary value close to 60%.

In addition, the time of datum (TD), which is calculated by experiments, is a time period in the unit of sec. And it is determined that the compressor enters a low flow rate state of refrigerant, if the state satisfying the above conditions is continued during the time of datum (TD).

In the graph shown in FIG. 3, upon seeing a point where the vehicle speed is lowered than the low speed reference value for the first time, the accelerating rate is not greater than the non-acceleration reference value, and the compressor operating rate, i.e., the ECV duty, is not greater than the operating rate reference value, so that the three low flow rate determination factors satisfy the conditions. However, the state of satisfying the conditions is not continued during the time of datum, but the accelerating rate is increased over the non-acceleration reference value before the time of datum elapses.

Thus, the main controller 110 determines that the compressor is not in the low flow rate state of refrigerant, thereby not increasing the ECV duty.

Thereafter, upon seeing a point where the vehicle speed is lowered than the low speed reference value at the second time, it would be understood that the time of datum elapses while the accelerating rate is not greater than the non-acceleration reference value and the ECV duty is not greater than the operating rate reference value. In this case, the main controller 110 determines that the compressor is in the low flow rate state of refrigerant and increases the ECV duty.

At this time, the main controller 110 increases the ECV duty to a preset forced value and then maintains the value for a certain time (hereinafter, referred to as "time of maintenance").

Here, the forced value is suitably calculated by experiments in advance such that the compressor may escape from the low flow rate state of refrigerant when it is determined that the vehicle speed, the accelerating rate and the ECV duty are respectively detected lower than their reference values during the time of datum and thus the compressor is in the low flow rate state of refrigerant. The forced value is at least equal to or greater than the operating rate reference value.

In addition, the time of maintenance (TM), which is calculated by experiments, is a time period enough to allow the compressor to be prevented from entering the low flow rate state of refrigerant again, by permitting the refrigerant of the compressor to smoothly flow.

Thus, the ECV duty is increased to prevent the compressor from entering the low flow rate state of refrigerant and generating noise. However, if the main controller 110 did not increase the ECV duty, the compressor would enter the low flow rate state of refrigerant and thus cause noise.

In addition, after the time of maintenance, the ECV duty is lowered again, so that the original state is maintained.

At this time, as shown in the figures, the vehicle speed, the accelerating rate and the ECV duty are maintained over the time of datum as being not greater than the low speed reference value, the non-acceleration rate reference value and the operating rate reference value, respectively, but the main controller 110 does not increase the ECV duty until a predetermined time (hereinafter, referred to as "time of cycle") is passed. This is because the compressor does not enter the low flow rate state of refrigerant during the time of cycle as the ECV duty is increased.

In other words, the time of cycle is calculated by experiments and represents a minimal time required for the compressor to enter the low flow rate state of refrigerant after the compressor is operated with the forced value during the time of maintenance.

A method for controlling a compressor of an air conditioner for a vehicle according to the first embodiment of the present invention will be described. The method for controlling a compressor according to this embodiment firstly starts together with driving the air conditioner (S100).

Then, it is determined whether the compressor 300 satisfies the entry conditions according to the present invention (S110).

At this time, the entry conditions are satisfied when the state of satisfying all of the compressor operating rate condition, the vehicle non-accelerating condition and the low vehicle speed condition are maintained over the time of datum.

Here, the compressor operating rate condition means that the ECV duty is not greater than the operating rate reference value, the non-accelerating condition means that the vehicle accelerating rate (the degree of opening of a throttle valve) is not greater than the non-acceleration reference value, the vehicle speed condition means that the vehicle speed is not greater than the low speed condition, and the above state is maintained over the time of datum (TD), as mentioned above.

In other words, step S110 is executed in such a manner that the time is counted from the moment when the vehicle speed, the vehicle accelerating rate and the compressor operating rate become not greater than the reference values, respectively, and then it is monitored whether the vehicle speed, the vehicle accelerating rate and the compressor operating rate are maintained as being not greater than the reference values, respectively, until the counted time becomes equal to the time of datum (TD).

In step S110, if it is determined that the entry conditions are not satisfied, the air conditioner control unit 100 executes a common ECV control (S120). Here, the common ECV control means that after the state information on a vehicle is detected, ECV duty is controlled according to the discharge capacity of the compressor 300 such that the temperature inside the vehicle is changed to a desired temperature.

Meanwhile, if the entry conditions are satisfied, the time is counted again (S130). The time counted here is not accumulated to the time counted in step S110 for determining whether the entry conditions are satisfied. In other words, the time is initiated and then counted from zero (0) again.

Also, since at the same time, the entry conditions are satisfied in step S110, the ECV duty is output as the forced value to control the compressor (S140). At this time, the forced value is set as being not smaller than the operating rate reference value and not smaller than an approximately middle value in the compressor operable range, as mentioned above. Since the entry conditions are satisfied in step S110, it is determined that the compressor is in the low flow rate state of refrigerant, thereby preventing noise by outputting the ECV duty as a high forced value.

In addition, while the ECV duty is controlled as the forced value, it is monitored whether the counted time which is being counted from step S130 is equal to or greater than a predetermined time of maintenance (S150).

The time of maintenance means a time period for maintaining the ECV duty as the forced value, and is a time period calculated by experiments for allowing the refrigerant of the compressor to smoothly flow and thus preventing the compressor from entering the low flow rate state of refrigerant.

If it is determined that the counted time of step S150 is equal to or greater than the time of maintenance, the compressor is controlled according to a common ECV control method (S160). Here, the common ECV control means that after the state information on a vehicle is detected, the ECV duty is controlled according to the discharge capacity of the compressor such that the temperature in the vehicle is changed to a desired temperature, as mentioned above.

On the other hand, if it is determined that the counted time of step S150 does not pass the time of maintenance, the ECV duty for controlling the compressor is maintained as the forced value.

Meanwhile, while the counted time exceeds the time of maintenance and thus the compressor is controlled in a common ECV control manner, the time counting initiated in step S130 is continued to determine whether the counted time is equal to or greater than the time of cycle (S170).

Then, if the counted time is equal to or greater than the time of cycle as a result of step S170, the series of steps starting from step S110 for determining whether a vehicle state satisfies the entry conditions is repeated.

In addition, the second embodiment of the present invention will be described with reference to FIGS. 5 and 6.

Figure 5:
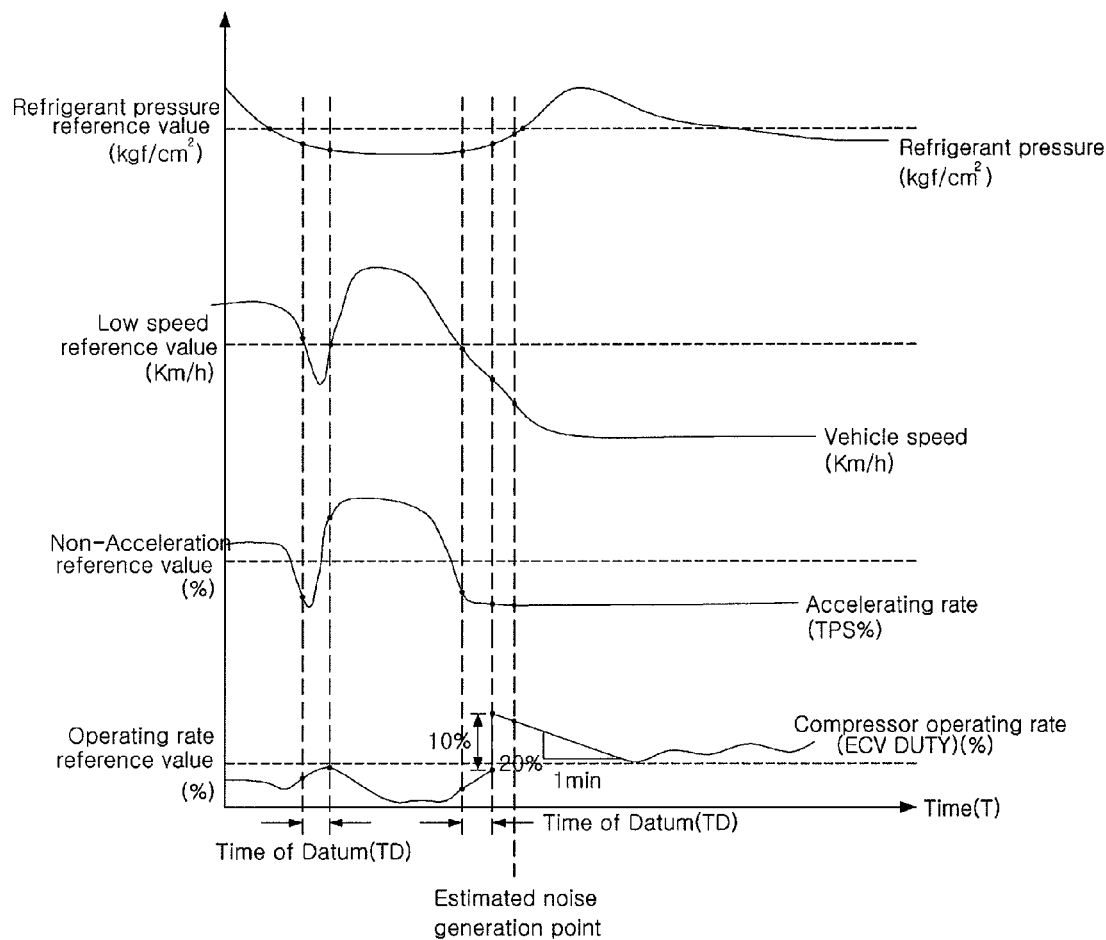
FIG. 5 is a graph showing a change in ECV duty according to the operation in accordance to a second embodiment of the present invention.
Figure 6:
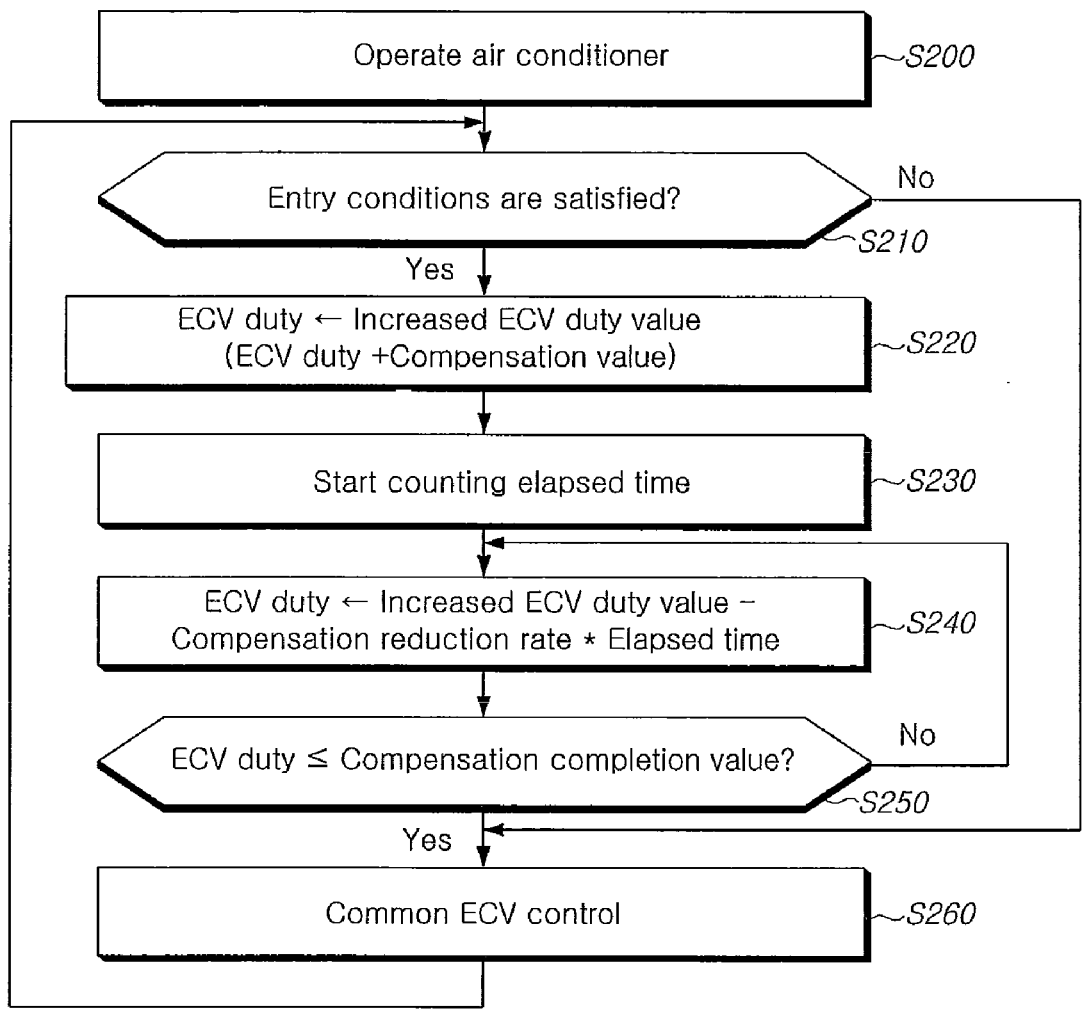
FIG. 6 is a flowchart illustrating a method for controlling a compressor of an air conditioner for a vehicle according to the second embodiment of the present invention.

FIG. 5 is a graph showing a change in ECV duty according to the operation in accordance to a second embodiment of the present invention, and FIG. 6 is a flowchart illustrating a method for controlling a compressor of an air conditioner for a vehicle according to the second embodiment of the present invention.

First, FIG. 5 shows vehicle driving and compressor operation states when an air conditioner operates while a vehicle is driven.

The uppermost graph represents compressor refrigerant pressure, the second graph represents vehicle speed, the graph thereunder represents vehicle accelerating rate that is measured by the valve sensor 220, and the lowermost graph represents compressor operating rate. Also, an x axis represents time.

At this time, the refrigerant pressure is expressed in the unit of $Kgf/cm^2$, the vehicle speed is expressed in the unit of Km/h, the vehicle accelerating rate is expressed as a percentage of opening of the throttle valve 400 (TPS %), and the ECV duty of a compressor is expressed in the unit of %.

Here, when continued over a predetermined time (hereinafter, referred to as "time of datum") are conditions that the refrigerant pressure is less than a predetermined value (hereinafter, refereed to as "refrigerant pressure reference value"), the vehicle speed is less than a predetermined speed (hereinafter, referred to as "low speed reference value"), the accelerating rate is less than a predetermined value (hereinafter, referred to as "non-acceleration reference value") and the ECV duty is less than a predetermined value (hereinafter, referred to as "operating rate reference value"), the compressor enters a low flow rate state of refrigerant to generate noise, and the main controller 110 determines that the workability is deteriorated.

However, the above process is just an example of determining the low flow rate state of refrigerant of a compressor, and all the above parameters of the refrigerant pressure, the vehicle speed, the accelerating rate and the compressor operating rate may be not used simultaneously in determining the low flow rate state of refrigerant of a compressor. In other words, the refrigerant pressure may be not selected as a basis for determining the low flow rate state of refrigerant of a compressor.

At this time, the refrigerant pressure reference value is expressed in the unit of $Kgf/cm^2$, the low speed reference value is expressed in the unit of Km/h, the non-acceleration reference value is a reference value, which defines a state where a vehicle is not accelerated or the accelerating rate is very low, and which is expressed as the percentage of opening of the throttle valve 400 (TPS %), and the operating rate reference value is an arbitrary value pertaining to a middle section in a compressor operable range and expressed as ECV duty in the unit of %. For example, assuming that the ECV duty of a vehicle compressor is varied between 35% and 85%, the operating rate reference value is an arbitrary value close to 60%.

Here, the refrigerant reference value, the low speed reference value, the non-acceleration reference value and the operating rate reference value are calculated by experiments as reference values for determining the low flow rate state of a compressor. As an example, the refrigerant reference value may be 9 $Kgf/cm^2$, the low speed reference value may be 30 Km/h, the non-acceleration reference value may be 6%, and the operating rate reference value may be 60% ECV duty.

In addition, the time of datum (TD), which is calculated by experiments, is a time period in the unit of sec. And it is determined that the compressor enters a low flow rate state of refrigerant, if the state satisfying the above conditions is continued during the time of datum (TD).

In the graph shown in FIG. 5, upon seeing a point where the vehicle speed is lowered than the low speed reference value for the first time, the refrigerant pressure is less than the refrigerant pressure reference value, the accelerating rate is less than the non-acceleration reference value, and the compressor operating rate is less than the operating rate reference value, so that the four low flow rate determination factors satisfy the conditions. However, the state of satisfying the conditions is not continued during the time of datum, but the accelerating rate is increased over the non-acceleration reference value before the time of datum elapses. Thus, the main controller 110 determines that the compressor is not in the low flow rate state of refrigerant, thereby not increasing the ECV duty.

Thereafter, upon seeing a point where the vehicle speed is lowered than the low speed reference value at the second time, it would be understood that the time of datum elapses while the refrigerant pressure is less than the refrigerant pressure reference value, the accelerating rate is less than the non-acceleration reference value and the compressor operating rate is less than the operating rate reference value. In this case, the main controller 110 determines that the compressor is in the low flow rate state of refrigerant and increases the ECV duty.

At this time, the main controller 110 increases the current ECV duty to an ECV duty value increased by a preset ECV duty compensation value. This is to increase the ECV duty for preventing the compressor from entering the low flow rate state and generating noise. However, if the main controller 110 did not increase the ECV duty, the compressor would enter the low flow rate state of refrigerant and thus cause noise.

Then, after the increased ECV duty is reduced at a certain ratio (a compensation reduction rate) to the initial ECV duty, the ECV duty is controlled in a common manner.

Here, the ECV duty compensation value, which is an increment of ECV duty for preventing the compressor from entering the low flow rate state, is calculated by experiments. Preferably, 10% or so of the ECV duty is set as an ECV duty compensation value. However, in order to prevent the ECV duty from being excessively increased, it is preferred that the ECV duty increased by the ECV duty compensation value does not exceed 85%.

Meanwhile, the compensation reduction rate is a reduction rate for preventing the ECV duty from being rapidly changed, when the ECV duty is reduced. Preferably, the reduction rate is set such that 20% of the ECV duty is reduced per minute.

Further, the compensation reduction rate of the ECV duty is also a value calculated by experiments, and it is preferred that the ECV duty is controlled in a common manner after the ECV duty is reduced at a rate of 20% per minute.

In the meantime, a method for controlling a compressor of an air conditioner for a vehicle according to the second embodiment of the present invention will be described step by step with reference to FIG. 6. The method for controlling a compressor according to this embodiment firstly starts together with driving the air conditioner (S200).

Then, if the air conditioner operates, it is determined whether a vehicle satisfies the entry conditions according to the embodiment of the present invention (S210).

At this time, the entry conditions are satisfied when the state of satisfying all of the refrigerant pressure condition, the compressor operating rate condition, the vehicle non-accelerating condition and the low vehicle speed condition is maintained over a preset time of datum (TD).

Here, the refrigerant pressure condition means that the refrigerant pressure of the compressor 300 is less than the refrigerant pressure reference value, the compressor operating rate condition means that the ECV duty is not greater than the operating rate reference value, the non-accelerating condition means that the vehicle accelerating rate (the degree of opening of a throttle valve) is not greater than the non-acceleration reference value, and the vehicle speed condition means that the vehicle speed is not greater than the low speed condition Then, it is also determined whether such a state is maintained over the time of datum (TD), and then it is determined whether the entry conditions are satisfied.

If it is determined that the state of satisfying all of the refrigerant pressure condition, the compressor operating rate condition, the vehicle non-accelerating condition and the low vehicle speed condition is maintained for the time of datum (TD) as a determination result of step S210, the ECV duty of the compressor is increased to the increased ECV duty value (S220).

At this time, the increased ECV duty value is equal to a value obtained by adding the ECV duty compensation value to the ECV duty at a time point that the entry conditions are satisfied in step S210, i.e., a current time point that the time of datum (TD) is passed after the refrigerant pressure condition, the compressor operating rate condition, the vehicle non-accelerating condition and the low vehicle speed condition are all satisfied.

The ECV duty compensation value is an increment of ECV duty, which prevents the compressor from entering the low flow rate state, as mentioned above. The ECV duty compensation value is calculated by experiments, and about 10% of ECV duty may be set as the ECV duty compensation value.

For example, if the ECV duty at a current time point when the entry conditions are satisfied is 40% and the preset ECV duty compensation value is 10%, the increased ECV duty value becomes 50%. Also, in step S220, the compressor is controlled by setting the increased ECV duty value of 50% as the ECV duty of the compressor.

Then, with the ECV duty increased to the increased ECV duty value, i.e., with the current ECV duty increased by the ECV duty compensation value, it is initiated to count the elapsed time (S230).

Here, the elapsed time is counted in order to linearly decrease the ECV duty according to the preset compensation reduction rate together with increasing the ECV duty as mentioned above. At this time, the compensation reduction rate is a reduction rate for preventing rapid change of the ECV duty and may be set as an ECV duty reduction rate with respect to time (for example, a 20% reduction rate of ECV duty per minute). Accordingly, the elapsed time is counted, so that the ECV duty is reduced at a preset constant rate according to the elapsed time.

Thus, in step S220, with the ECV duty increased, the elapsed time is counted and the ECV duty is slowly reduced. The ECV duty is calculated as a value obtained by subtracting a value multiplying the compensation reduction rate by the elapsed time from the increased ECV duty value calculated in step S220 (S240).

In other words, in a case where the ECV duty at the time point when the entry conditions are satisfied is 40%, the preset ECV duty compensation value is 10%, and thus the increased ECV duty value is 50%, if the compensation reduction rate is 20%, the ECV duty for controlling the compressor at a point that 15 seconds are elapsed is obtained by subtracting 20%/minute×15 seconds from 50%, which is 45%.

In step S240 as mentioned above, the ECV duty is continuously calculated and controlled as the elapsed time is passed.

Then, while executing step S240 as mentioned above, it is continuously monitored whether the current ECV duty calculated in step S240 is reduced below a compensation completion value (S250).

At this time, the compensation completion value may be obtained by subtracting the ECV duty compensation value from the increased ECV duty value. Here, the value obtained by subtracting the ECV duty compensation value from the increased ECV duty value becomes an ECV duty value when the entry conditions are satisfied in steps S210 and S220. In other words, this value may be an ECV duty before the ECV duty was forcibly increased, but may be set as another different value. For example, the compensation completion value may be equal to the operating rate reference value.

In other case, step S250 may be executed by comparing the elapsed time with a preset time. For example, if the preset ECV duty compensation value is 10% and the compensation reduction rate is 20% per minute, the increased ECV duty is recovered to the initial value after 30 seconds, so that step S250 may be executed by monitoring whether the elapsed time is 30 seconds or more.

In addition, as a result of the determination in step S250, when the ECV duty is not greater than the compensation completion value or the elapsed time is a preset time or more, the compressor is controlled in a common ECV control manner (S260). Here, the common ECV control means that after the state information on a vehicle is detected, the ECV duty is controlled according to the discharge capacity of the compressor 300 such that the temperature in the vehicle is set to the user's desired temperature.

According to a method for controlling a compressor of an air conditioner for a vehicle of the present invention as discussed above, the following advantages can be expected.

That is, the compressor is prevented from entering a low flow rate state of refrigerant by predicting a low flow rate state of refrigerant of the compressor and then increasing ECV duty. Thus, there is an advantage in that the workability of the compressor is improved.

Further, in the present invention, the compressor is prevented from entering a low flow rate state of refrigerant by predicting a low flow rate state of refrigerant of the compressor and then increasing ECV duty, thereby decreasing noise generated from the compressor and thus giving stability to users.

Furthermore, when ECV duty is increased according to the present invention, the ECV duty is increased to a middle value in a common operable range of the ECV duty. Thus, there are advantages in that the ECV duty is prevented from being excessively increased (in comparison to a case where the ECV duty is increased to the maximum) to thereby make it possible to improve the fuel efficiency of a vehicle and prevent excessive torque and thus fluctuation of the engine RPM from occurring.

Moreover, when the ECV duty is decreased after the ECV duty is increased according to the present invention, the ECV duty is decreased at a moderate rate, thereby decreasing fluctuation of the ECV duty and thus reducing an influence on a change in vehicle torque.

The scope of the present invention is not limited to the embodiments described above but is defined by the appended claims. It will be apparent that those skilled in the art can make various modifications and changes thereto within the scope of the invention defined by the claims.

What is claimed is:

1. A method for controlling a compressor of an air conditioner for a vehicle, comprising the steps of:
   monitoring whether vehicle speed and accelerating rate satisfy predetermined conditions and determining whether a variable capacity swash plate type compressor enters a low flow rate state of refrigerant;
   controlling discharge capacity of the compressor to a predetermined value if it is determined that the compressor enters the low flow rate state of refrigerant,
   determining whether a time of maintenance during which the discharge capacity is maintained to the predetermined value elapses;
   controlling the discharge capacity in a common manner if the time of maintenance elapses; and
   determining whether a preset time of cycle elapses,
   wherein after the time of cycle elapses, the above steps are repeated from the step of determining whether a compressor enters a low flow rate state of refrigerant.

2. The method as claimed in claim 1, wherein in the step of controlling discharge capacity of the compressor to a predetermined value, the discharge capacity of the compressor is controlled to the predetermined value if the vehicle speed, the accelerating rate and the discharge capacity of the compressor satisfy predetermined conditions, and the predetermined value is an approximately middle value in a discharge capacity range of the compressor.

3. The method as claimed in claim 2, wherein the approximately middle value in the discharge capacity range is a predetermined value between 45% and 65% in the discharge capacity range.

4. A method for controlling a compressor of an air conditioner for a vehicle, comprising the steps of:
   monitoring whether vehicle speed and accelerating rate satisfy predetermined conditions and determining whether a variable capacity swash plate type compressor enters a low flow rate state of refrigerant;
   controlling discharge capacity of the compressor to a predetermined value if it is determined that the compressor enters the low flow rate state of refrigerant,
   wherein in the step of controlling discharge capacity of the compressor to a predetermined value, the discharge capacity of the variable capacity swash plate type compressor is increased by a predetermined value, and
   wherein after the discharge capacity of the compressor is increased, the discharge capacity of the compressor is linearly reduced according to a predetermined reduction rate.

5. The method as claimed in claim 4, wherein the discharge capacity of the compressor is increased by increasing ECV duty by about 10% thereof.

6. The method as claimed in claim 4, wherein the reduction rate of the discharge capacity of the compressor is about 20% of ECV duty per minute.

7. The method as claimed in claim 4, wherein when it is determined whether the compressor enters a low flow rate state of refrigerant, it is considered whether refrigerant pressure of the compressor satisfies a predetermined condition.

* * * * *